(12) United States Patent
Liu et al.

(10) Patent No.: US 11,052,938 B2
(45) Date of Patent: Jul. 6, 2021

(54) MOTOR AND WORM CONNECTION DEVICE FOR ELECTRIC POWER STEERING SYSTEM

(71) Applicant: THYSSENKRUPP PRESTA SHANGHAI CO., LTD., Shanghai (CN)

(72) Inventors: Qing Liu, Shanghai (CN); Bin Lu, Shanghai (CN)

(73) Assignee: THYSSENKRUP PRESTA SHANGHAI CO., LTD., Shanghai (CN)

( * ) Notice: Subject to any disclaimer, the term of this patent is extended or adjusted under 35 U.S.C. 154(b) by 559 days.

(21) Appl. No.: 16/062,555

(22) PCT Filed: Dec. 22, 2016

(86) PCT No.: PCT/CN2016/111454
§ 371 (c)(1),
(2) Date: Jun. 14, 2018

(87) PCT Pub. No.: WO2017/107946
PCT Pub. Date: Jun. 29, 2017

(65) Prior Publication Data
US 2020/0164913 A1  May 28, 2020

(30) Foreign Application Priority Data
Dec. 22, 2015 (CN) .......................... 201510976913.1

(51) Int. Cl.
B62D 5/04 (2006.01)
F16D 3/78 (2006.01)

(52) U.S. Cl.
CPC ............. B62D 5/0454 (2013.01); F16D 3/78 (2013.01)

(58) Field of Classification Search
CPC . B62D 5/0454; F16D 3/78; F16D 3/70; F16D 3/79; H02K 7/081; H02K 7/1166
(Continued)

(56) References Cited

U.S. PATENT DOCUMENTS 2,879,650 A * 3/1959 Martin ...................... F16D 3/78
464/72
4,482,335 A * 11/1984 Goody ...................... F16D 3/79
464/94

(Continued)

FOREIGN PATENT DOCUMENTS

| CN | 101128682 A | 2/2008 |
|---|---|---|
| CN | 201218290 Y | 4/2009 |

(Continued)

OTHER PUBLICATIONS

Machine language translation of CN 20524444 U obtained from PE2E Search on Mar. 23, 2021 (Year: 2016).*

(Continued)

*Primary Examiner* — Minnah L Seoh
*Assistant Examiner* — Hosam Shabara
(74) *Attorney, Agent, or Firm* — thyssenkrupp North America, LLC

(57) ABSTRACT

An apparatus for connecting an electric machine and a worm for an electric power steering system, including an electric machine, an electric machine shaft connected to the electric machine, and a worm. An end of the electric machine shaft is provided with a first mounting flange, and an end of the worm is provided with a second mounting flange. The apparatus includes at least one disk between the first mounting flange of the electric machine shaft and the second mounting flange of the worm. The apparatus for connecting an electric machine and a worm for an electric power steering system provided in the present invention is struc- (Continued)

turally simple, and at the same time transfers electric machine torque with high efficiency, and can effectively compensate for radial deviation and axial deviation between the electric machine shaft and a worm shaft.

10 Claims, 1 Drawing Sheet

(58) Field of Classification Search
USPC .......................................................... 180/444
See application file for complete search history.

(56) References Cited

U.S. PATENT DOCUMENTS

| | | | | |
|---|---|---|---|---|
| 6,440,000 | B1* | 8/2002 | Asa ........................... | F16D 3/58 |
| | | | | 464/147 |
| 7,699,708 | B2* | 4/2010 | Kubota ..................... | F16D 3/68 |
| | | | | 464/73 |
| 10,415,648 | B2* | 9/2019 | Chase ....................... | F16D 3/78 |
| 10,794,429 | B2* | 10/2020 | Huber ...................... | F16D 1/076 |
| 2006/0211501 | A1* | 9/2006 | Corey ....................... | F16D 3/79 |
| | | | | 464/99 |
| 2008/0035414 | A1* | 2/2008 | Kubota ..................... | F16D 3/68 |
| | | | | 180/444 |
| 2008/0128195 | A1* | 6/2008 | Kubota ..................... | F16D 3/68 |
| | | | | 180/444 |
| 2012/0283028 | A1* | 11/2012 | Abe .......................... | F16D 3/78 |
| | | | | 464/69 |
| 2012/0322566 | A1 | 12/2012 | Kim | |
| 2014/0027197 | A1* | 1/2014 | Kikuchi ............... | B62D 5/0454 |
| | | | | 180/444 |
| 2016/0146262 | A1* | 5/2016 | Kogure ..................... | F16D 3/68 |
| | | | | 180/444 |

FOREIGN PATENT DOCUMENTS

| | | |
|---|---|---|
| CN | 201261491 Y | 6/2009 |
| CN | 201786953 U | 4/2011 |
| CN | 202243632 U | 5/2012 |
| CN | 202737654 U | 2/2013 |
| CN | 205524444 U | 8/2016 |
| DE | 102012010869 A | 12/2012 |
| EP | 2 689 988 A | 1/2014 |
| GB | 923 494 A | 4/1963 |
| JP | 2003095118 A | 4/2003 |
| JP | 2012 126334 A | 7/2012 |
| KR | 20110073004 A | 6/2011 |

OTHER PUBLICATIONS

Machine language translation of CN 201786953 U obtained from PE2E Search on Mar. 23, 2021 (Year: 2011).*

English Translation of International Search Report issued in PCT/CN2016/111454, dated Feb. 20, 2017 (dated Mar. 16, 2017).

* cited by examiner

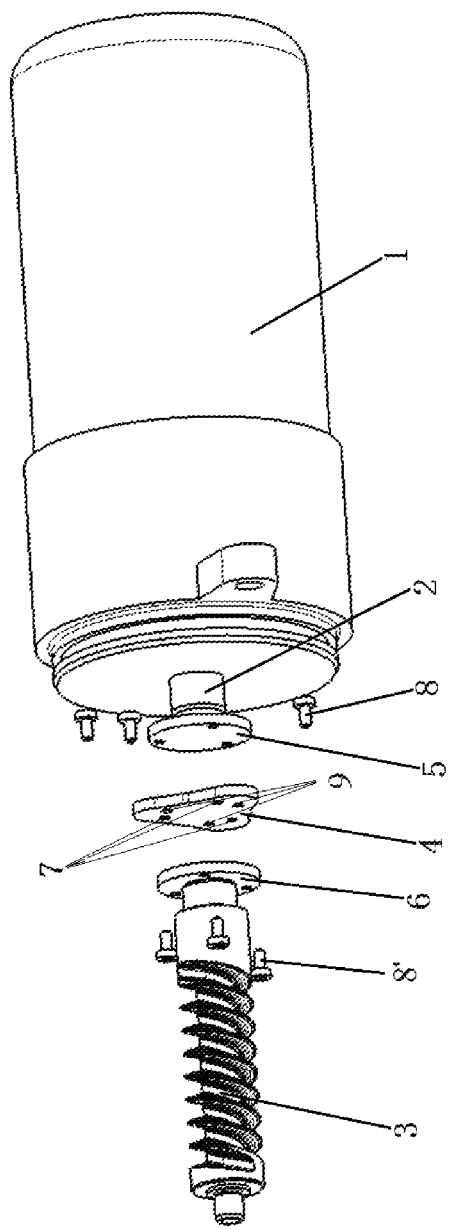

MOTOR AND WORM CONNECTION DEVICE FOR ELECTRIC POWER STEERING SYSTEM

CROSS REFERENCE TO RELATED APPLICATIONS

This application is a U.S. National Stage Entry of International Patent Application Serial Number PCT/CN2016/111454, filed Dec. 22, 2016, which claims priority to Chinese Patent Application No. CN 201510976913.1, filed Dec. 22, 2015, the entire contents of both of which are incorporated herein by reference.

FIELD

The present disclosure generally relates to an electric power steering system of a vehicle, in particular to an apparatus for connecting an electric machine and a worm for an electric power steering system of a motor vehicle.

BACKGROUND

As the motor vehicle industry rapidly develops, the performance requirements for steering devices are becoming ever more stringent. Conventional purely mechanical steering devices and hydraulic steering devices are already unable to meet the requirements of the development of the motor vehicle industry, especially in the case of mid- to high-end vehicles, and have been replaced with electric power steering. An electric power steering (EPS) device is a high-tech motor vehicle steering apparatus which is energy-saving, safe and environmentally friendly, and represents the direction in which motor vehicle steering systems are developing. EPS has become one of the key technologies in global motor vehicle product competition; EPS is structurally compact, easy to assemble and maintain, and has a good level of integration. Both pinion EPS devices and column EPS devices need to use a worm/worm-gear apparatus. In these EPS devices, a worm is connected to an electric machine shaft, and the worm drives a worm gear to rotate under the action of the electric machine shaft, so that the worm gear and worm serve the function of speed reduction and torque transfer.

The electric machine and the worm in existing EPS systems mainly employ a direct spline connection. The spline connection places extremely high requirements on an electric machine, worm and housing components in terms of machining precision; if the worm and the electric machine shaft exceed tolerances in an axial direction and/or a radial direction during assembly, fitting of the worm to the electric machine will be difficult; normal fitting may be even be impossible. Even after fitting, radial deviation and/or axial deviation between the electric machine shaft and a worm shaft cannot be compensated for effectively, and a mechanism gap will ultimately result in the worm/worm-gear apparatus having an excessively large drive gap, readily giving rise to abnormal noises. At the same time, the abnormal meshing will give rise to abnormal wear. In another existing technology, a plastic coupling connection is used between the worm shaft and the electric machine shaft. Although such a connection method can to a certain extent compensate for radial deviation between the electric machine shaft and the worm shaft, it is still unable to compensate for axial deviation.

Thus a need exists for connecting an electric machine and a worm for an electric power steering system, for a new type of apparatus for connecting an electric machine and a worm, wherein the apparatus for connecting an electric machine and a worm is not only able to simultaneously compensate for radial deviation and axial deviation between an electric machine shaft and a worm shaft, but also has advantages such as a simple structure and ease of assembly.

BRIEF DESCRIPTION OF THE FIGURE

FIG. 1 is an exploded schematic view of an apparatus for connecting an electric machine and a worm for an electric power steering system according to an embodiment.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to an electric power steering system of a vehicle, in particular to an apparatus for connecting an electric machine and a worm for an electric power steering system of a motor vehicle.

In some examples, an apparatus for connecting an electric machine and a worm for an electric power steering system is proposed. The apparatus for connecting an electric machine and a worm comprises an electric machine, an electric machine shaft connected to the electric machine, and a worm, wherein an end of the electric machine shaft is provided with a first mounting flange, and an end of the worm is provided with a second mounting flange. The apparatus for connecting an electric machine and a worm is characterized in that at least one disk is provided between the first mounting flange of the electric machine shaft and the second mounting flange of the worm.

Preferably, only one disk may be provided between the first mounting flange of the electric machine shaft and the second mounting flange of the worm.

Preferably, the disk may be provided with at least one first through-hole, wherein a first bolt passes through the first mounting flange and the first through-hole, connecting the disk to the electric machine shaft, and the disk may also be provided with at least one second through-hole, wherein a second bolt passes through the second mounting flange and the second through-hole, connecting the disk to the worm.

Preferably, at least two disks could also be provided between the first mounting flange of the electric machine shaft and the second mounting flange of the worm.

Preferably, a first disk, adjacent to the electric machine shaft, among the at least two disks may be provided with at least one first through-hole, wherein a first bolt passes through the first mounting flange and the first through-hole, connecting the first disk to the electric machine shaft, and a second disk, adjacent to the worm, among the at least two disks may be provided with at least one second through-hole, wherein a second bolt passes through the second mounting flange and the second through-hole, connecting the second disk to the worm.

Preferably, adjacent disks among the at least two disks may be connected together using another bolt.

Preferably, the first through-holes of the disk may be at least three in number, and the second through-holes of the disk may be at least three in number.

Preferably, a hollow tubular rubber component may be further provided in the through-holes of the disk(s).

Preferably, the at least one disk may have one of the following shapes: circular, triangular, square, polygonal, and circular with a central hole.

According to another aspect of the present invention, also proposed is an electric power steering system using the apparatus for connecting an electric machine and a worm as described above.

The apparatus for connecting an electric machine and a worm for an electric power steering system, and the corresponding electric power steering system, provided in the present invention are structurally simple and have obvious cost advantages, and at the same time as transferring electric machine torque with high efficiency, can effectively compensate for both radial deviation and axial deviation between the electric machine shaft and the worm shaft, to effectively eliminate abnormal noises and wear resulting from abnormal meshing between components, and can be widely applied to existing steering columns of various types.

Demonstrative embodiments of the present invention are explained in detail below with reference to the accompanying drawing. For the sake of clarity and conciseness, actual embodiments are not limited to the technical features described herein. It must be explained that in the process of improving or altering any actual embodiment, in order to achieve a specific objective, the improvement or alteration process might be very complex and time-consuming, but is this is still a conventional technical measure to persons skilled in the art who know the benefits of the present invention. These embodiments are implemented taking the technical solution of the present invention as a precondition, and the detailed manner and process of implementation have been given; however, the scope of protection of the present invention includes but is not limited to the following embodiments.

FIG. 1 is an exploded schematic view of an apparatus for connecting an electric machine and a worm for an EPS system according to an embodiment of the present invention. The apparatus for connecting an electric machine and a worm as shown in FIG. 1 comprises an electric machine 1 and a worm 3. The electric machine 1 comprises an electric machine shaft 2, which is axially coupled to the worm 3 and used for driving the worm 3 to rotate. An end, facing the worm 3, of the electric machine shaft 2 is provided with a mounting flange 5; an end, facing the electric machine 1, of the worm 3 is provided with a mounting flange 6. As shown in FIG. 1, one or more disks (or disk springs) 4 is/are provided between the mounting flange 5 and the mounting flange 6. According to one embodiment of the present invention, one disk 4 is provided between the mounting flange 5 and the mounting flange 6, as shown in FIG. 1. The disk 4 is provided with multiple through-holes 7, 9, wherein first through-holes 7 correspond to through-holes in the mounting flange 5, and second through-holes 9 correspond to through-holes in the mounting flange 6. First bolts 8 at the side on which the electric machine 2 is located can pass sequentially through the mounting flange 5 and the first through-holes 7 in the disk 4, connecting the disk 4 to the electric machine 2 by means of bolt nuts for example. Moreover, second bolts 8' at the side on which the worm 3 is located can pass sequentially through the mounting flange 6 and the second through-holes 9 in the disk 4, connecting the disk 4 to the worm 3 by means of bolt nuts for example. The worm 3 is thereby axially connected to the electric machine shaft 2 of the electric machine 1 by means of the disk 4. Here, since the worm 3 and the electric machine 1 are each independently connected to the disk 4, radial deviation and axial deviation between the electric machine shaft and a worm shaft can be compensated for effectively by making use of the elasticity of the disk 4, eliminating a gap between components, and thereby avoiding abnormal noises or wear resulting from abnormal meshing between components.

According to a preferred embodiment of the present invention, the first through-holes 7 of the disk 4 are at least 3 in number, preferably 3; and the second through-holes 9 of the disk 4 are at least 3 in number, preferably 3. Furthermore, the multiple through-holes of the disk 4 may have no screw-threads, so that the disk is connected in a locked manner to the corresponding mounting flange by means of bolt nuts. According to a preferred embodiment of the present invention, the material of the disk 4 may be stainless steel. In addition, as would readily occur to those skilled in the art, the shape of the disk 4 is optimized so as to adapt to different rigidities in radial and axial directions. According to a preferred embodiment of the present invention, the disk 4 may be circular, triangular, square, polygonal, or circular with a central hole. The thickness of the disk 4 is for example in the range of 0.5 mm-5 mm.

According to another embodiment of the present invention, the disk between the worm 3 and the electric machine 1 may be not just one; the number thereof may be suitably chosen such that the required compensation amount and rigidity can be ensured. In the case of multiple disks (not shown in FIG. 1), a first disk adjacent to the side on which the electric machine shaft 2 is located may still be connected to the electric machine shaft 2 by means of the first bolt 8, and a second disk adjacent to the side on which the worm 3 is located may still be connected to the worm 3 by means of the second bolt 8'. Here, adjacent disks among the multiple disks are connected to each other by a bolt. Such a specially designed manner of connection enables radial deviation and axial deviation between the electric machine shaft and the worm shaft to be compensated for effectively, thereby avoiding for example abnormal noises or wear resulting from abnormal meshing between components.

According to a preferred embodiment of the present invention, rubber components may be provided in the multiple through-holes of the disk 4; the rubber components may have a hollow tubular form, and are used to reduce wear and provide radial elastic compensation.

Here, for the sake of simplicity, other components of a worm/worm-gear mechanism are not shown in FIG. 1; the structure and arrangement of other components are known to those skilled in the art, for example a worm gear meshed with the worm and a housing structure outside the worm/worm-gear mechanism.

According to another preferred embodiment of the present invention, also proposed is an EPS system using the apparatus for connecting an electric machine and a worm as shown in FIG. 1. Since the core components and structure thereof have already been described in detail above, they are not described again here.

Although the present invention has been described in detail based on preferred embodiments, those skilled in the art should know that the scope of protection claimed in the present invention is not limited to these preferred embodiments. Various changes and amendments could be made to embodiments by those skilled in the art, based on an understanding of the present invention, without departing from the spirit and substance of the present invention, and thus fall within the scope of protection defined by the claims attached to the present invention.

What is claimed is:

1. An electric power steering system comprising:
   an electric machine,
   an electric machine shaft connected to the electric machine, the electric machine shaft including an end,
   a first mounting flange disposed on the end of the electric machine shaft,
   a worm operatively connected to the electric machine shaft, the worm including an end,
   a second mounting flange disposed on the end of the worm, and
   at least two disks disposed between the first mounting flange and the second mounting flange, wherein adjacent disks of the at least two disks are connected with a fastener.

2. The electric power steering system of claim 1 wherein a first disk of the at least two disks is disposed adjacent to the electric machine shaft and provided with a first through-hole, and a first bolt disposed through the first mounting flange and the first through-hole, connecting the first disk to the electric machine shaft, and a second disk of the at least two disks is disposed adjacent to the worm and provided with a second through-hole, and a second bolt disposed through the second mounting flange and the second through-hole, connecting the second disk to the worm.

3. The electric power steering system of claim 2 wherein the first and second disks are the adjacent disks that are connected via the fastener.

4. The electric power steering system of claim 2 wherein the first through-hole is at least three in number and the second through-hole is at least three in number.

5. The electric power steering system of claim 4 further comprising a hollow tubular rubber component disposed in each of the through-holes.

6. The electric power steering system of claim 1 wherein a first disk of the at least two disks is one of circular, triangular, square, polygonal, and circular with a central hole.

7. The electric power steering system of claim 1 wherein a first disk of the at least two disks is about 0.5 mm 5 mm thick.

8. The electric power steering system of claim 1 wherein a first disk of the at least two disks is planar and is limited to a first planar surface, a second planar surface that is opposite the first planar surface, a periphery that extends along an exterior of the disk between the first and second planar surfaces, and through-holes that extend from the first planar surface to the second planar surface.

9. An apparatus comprising:
   an electric machine;
   an electric machine shaft connected to the electric machine, the electric machine shaft including an end;
   a first mounting flange disposed on the end of the electric machine shaft;
   a worm operatively connected to the electric machine shaft, the worm including an end;
   a second mounting flange disposed on the end of the worm; and
   a disk disposed between the first mounting flange and the second mounting flange, wherein the disk is planar and is limited to a first planar surface, a second planar surface that is opposite and parallel to the first planar surface, and a periphery that extends along an exterior of the disk between the first and second planar surfaces, wherein the first mounting flange and the second mounting flange are independently connected to the disk,
   wherein the first mounting flange has a third planar surface that mates with the first planar surface of the disk and the second mounting flange has a fourth planar surface that mates with the second planar surface of the disk, wherein an entirety of a surface area of the third planar surface of the first mounting flange is in contact with the first planar surface of the disk, wherein an entirety of a surface area of the fourth planar surface of the second mounting flange is in contact with the second planar surface of the disk, wherein the disk is comprised of stainless steel, wherein the disk is triangular, square, or polygonal.

10. The apparatus of claim 9 wherein the disk includes a first through-hole and a second through-hole, a first bolt being disposed through the first mounting flange and the first through-hole to connect the disk to the electric machine shaft, a second bolt being disposed through the second mounting flange and the second through-hole to connect the disk to the worm.

* * * * *